United States Patent
Angermayer

(10) Patent No.: US 11,763,577 B2
(45) Date of Patent: Sep. 19, 2023

(54) METHOD, CONTROL UNIT AND COMPUTER PROGRAM TO DETERMINE A HEAD ORIENTATION AND/OR HEAD POSITION OF A VEHICLE OCCUPANT

(71) Applicant: ZF Friedrichshafen AG, Friedrichshafen (DE)

(72) Inventor: Jörg Angermayer, Friedrichshafen (DE)

(73) Assignee: ZF Friedrichshafen AG, Friedrichshafen (DE)

(*) Notice: Subject to any disclaimer, the term of this patent is extended or adjusted under 35 U.S.C. 154(b) by 742 days.

(21) Appl. No.: 16/796,561

(22) Filed: Feb. 20, 2020

(65) Prior Publication Data
US 2020/0265253 A1    Aug. 20, 2020

(30) Foreign Application Priority Data
Feb. 20, 2019 (DE) ................ 10 2019 202 302.9

(51) Int. Cl.
*G06V 20/59* (2022.01)
*G06T 7/70* (2017.01)
(Continued)

(52) U.S. Cl.
CPC ...... *G06V 20/597* (2022.01); *B60R 21/01538* (2014.10); *B60R 21/01552* (2014.10);
(Continued)

(58) Field of Classification Search
CPC ............. G06V 20/597; G06V 40/161; B60R 21/01538; B60R 21/01552; G06T 7/70
See application file for complete search history.

(56) References Cited

U.S. PATENT DOCUMENTS

| 8,152,198 B2* | 4/2012 | Breed ............... B60R 21/01516 |
| | | 701/45 |
| 10,317,900 B2* | 6/2019 | Kamhi ................ G06V 40/19 |
| 11,458,981 B2* | 10/2022 | Wieczorek ............ B60N 3/18 |

FOREIGN PATENT DOCUMENTS

| DE | 199 32 520 A1 | 2/2001 |
| DE | 103 21 506 A1 | 12/2004 |

(Continued)

OTHER PUBLICATIONS

Wang Hong-yan, Zhao Ming-ming, Beurier Georges, Wang Xu-guang. Automobile Driver Posture Monitoring Systems: A Review [J], China Journal of Highway and Transport, 2019 (02): 1-18. (Year: 2019).*

*Primary Examiner* — Elaine Gort
*Assistant Examiner* — Christopher R Cardimino
(74) *Attorney, Agent, or Firm* — Crowell & Moring LLP

(57) ABSTRACT

Determining head orientation and/or position of a vehicle occupant includes determining a first detection range for head orientations and/or positions of a first imagining sensor located in the vehicle interior based on various head orientations and/or positions in relation to the location of the first sensor, determining the second detection range of the second imaging sensor for head orientations and/or positions based on various head orientations and/or positions in relation to the position of the second sensor, and, based on the head orientation and/or position of the vehicle occupant, determining the head orientation and/or position with that sensor that has a detection range in which the head orientation and/or position can be better determined than in the detection range of another sensor.

18 Claims, 2 Drawing Sheets

(51) Int. Cl.
*G06V 40/16* (2022.01)
*B60R 21/015* (2006.01)

(52) U.S. Cl.
CPC .............. *G06T 7/70* (2017.01); *G06V 40/161* (2022.01); *G06T 2207/30201* (2013.01)

(56) References Cited

FOREIGN PATENT DOCUMENTS

| | | |
|---|---|---|
| DE | 60 2004 013 181 T2 | 7/2009 |
| DE | 10 2008 040 149 A1 | 1/2010 |
| DE | 10 2016 210 088 B3 | 7/2017 |
| DE | 10 2016 215 766 A1 | 3/2018 |
| JP | 2020142738 A * | 9/2020 |

* cited by examiner

METHOD, CONTROL UNIT AND COMPUTER PROGRAM TO DETERMINE A HEAD ORIENTATION AND/OR HEAD POSITION OF A VEHICLE OCCUPANT

CROSS-REFERENCE TO RELATED APPLICATIONS

This application claims priority from German Patent Application DE 10 2019 202 302.9, filed Feb. 20, 2019, the entirety of which is hereby incorporated by reference herein.

The invention relates to a method, control unit and computer program for determining a head orientation and/or head position of a vehicle occupant. The invention also relates to an interior monitoring system for a vehicle that has a control unit according to the invention. The invention further relates to a computer-readable data carrier on which the computer program according to the invention is stored.

Devices for controlling safety systems in a motor vehicle are known. By way of example, DE 19932520A1 discloses a device for controlling at least one safety system in a motor vehicle based on output signals from sensors for detecting the positions of objects and/or people on a seat in the motor vehicle, wherein at least two of the sensors are cameras pointing toward a seat in the motor vehicle, wherein a three dimensional image of the objects and/or people is obtained in an evaluation unit from the two dimensional images recorded in the cameras, from which the output signals are obtained, wherein the size and/or shape of the head of a person sitting on the seat can be output via the evaluation unit as the output signal.

It is possible to determine the position and orientation of a head with detection via a camera system. A high level of precision for all head positions is difficult to obtain.

This is the basis of the invention. The fundamental object of the invention is to optimize head position data.

The invention and exemplary embodiments of the invention shall be explained in the description and the figures.

The method according to the invention is used to determine a head orientation and/or head position of a vehicle occupant. The invention achieves the object in that first an initial detection range for head orientations and/or head positions by a first imaging sensor located in an interior of the vehicle is determined based on various head orientations and/or head positions in relation to the location of the first sensor. A second detection range for head orientations and/or head positions of at least one second imaging sensor located in the interior of the vehicle is also first determined based on various head orientations and/or head positions in relation to the position of the second sensor. Depending on the head orientation and/or head position of the vehicle occupant, the head orientation and/or head position is determined with the sensor in which the head orientation and/or head position can be better determined in its detection range than in the detection range of another sensor.

By using numerous imaging sensors, different levels of precision can be obtained for different head positions, depending on the positions of the sensors in the interior. According to the invention, the precisions of the two sensor is gauged in advance in the first two method steps. By way of example, the first imaging sensor is located behind a steering wheel on the windshield of a vehicle. The second imaging sensor is located, e.g. on the ceiling of the vehicle interior, to the right of the vehicle occupant. When the vehicle occupant is looking toward the steering wheel, the first imaging sensor has a precision of ±0.5 cm per ±1°. The second imaging sensor has a precision of ±3.5 cm per ±1°.

The precisions are determined in advance through tests, for example, wherein the head orientation and/or head position are gauged with a measurement system. In active use, only the data from those sensors in which the respective detection range has the highest precision for determining the head orientation and/or head position are used. When the detection ranges are known, it is then possible to automatically switch to the respective detection range. If, for example, the head rotates from a first position, in which the first sensor is mounted directly in the line of sight of the vehicle occupant, to a second position, in which the line of sight is directed toward the second sensor, the second sensor can then better determine the head orientation than the first sensor. The head is substantially located in the middle of the second detection range. As a result of the more precise determination of the head orientation and/or head position according to the invention, functions relating to safety that are dependent on a precise knowledge of the head orientation and/or head position, e.g. deployment of an airbag, can be better determined and triggered. As a result, overall driving safety is increased with the invention. The vehicle occupant is, e.g., the driver or a passenger in the front or back seat of the vehicle. The precision of the determination of the head orientation and/or head position is therefore improved according to the invention. With a more precise determination of the head orientation and/or head position, safety systems, in particular air bags or safety belt tensioners can be more effectively actuated.

According to another aspect of the invention, numerous imaging sensors are used. Only the data from the sensors in the detection ranges of which the head orientation and/or head position can be better determined are combined for determining the head orientation and/or head position of the vehicle occupant. In this manner, a data combination is optimized, and the determination of the head orientation and/or head position is improved with regard to safety and computing capacity.

The method is preferably executed by a computer.

The control unit according to the invention is configured for automated driving functions. The control unit comprises at least one first interface for receiving data from a first and at least one second imaging sensor. The control unit also comprises a computer. The computer comprises a memory in which the results of the two first method steps of the method according to the invention are already stored. The computer is also configured to execute the last step of the method according to the invention with numerous sensors and a data fusion, in order to determine a signal based on a specific head orientation and/or head position of a vehicle occupant. The control unit also comprises a second interface for outputting the signal.

A control unit prepares the data from sensor in the form of input signals, processes these with a computer, e.g. a computer platform, and outputs the logic and/or power level as regulating or control signals. The determined signal is a regulating or control signal. Vehicle actuators, in particular actuators for longitudinal and/or lateral control, and/or safety systems, are regulated and controlled with the determined signal via the second interface in order to enable an automated or autonomous driving mode. The control unit is connected to the sensors for signal transfer via the first interface. The first interface can comprise a component or numerous components, i.e. one component per sensor. The data exchange can be wireless or hard wired, e.g. via radio technology. The control unit is integrated in an electrical system in the road vehicle. The control unit is an electronic control unit for automated driving functions in particular, called a domain ECU in English, in particular an ADAS/AD domain ECU.

The computer in the control unit is implemented by way of example as a system-on-a-chip that has a modular hardware concept, i.e. all or at least most of the functions are integrated on a chip, and can be expanded modularly. The chip can be integrated in a control unit. The computer comprises a multi-core processor and memory modules, for example. The multi-core processor is configured for signal/ data exchange with the memory modules. The multi-core processor comprises a bus system, for example. The memory modules form the working memory. The memory modules are RAMs, DRAMs, SDRAMs, or SRAMs, for example. In a multi-core processor, numerous cores are placed on a single chip, i.e. a semiconductor component. Multi-core processors have a higher computing power and can be more economically implemented in a chip than with multi-processor systems, in which each individual core is located in a processor socket, and the individual processor sockets are located on a motherboard. The computer preferably comprises at least one central processing unit, abbreviated as CPU. The computer also comprises at least one graphics processing unit, GPU. Graphics processing units have a special microarchitecture for processing sequences in parallel. In particular, the graphics processing unit comprises at least one processing unit that is specifically configured for executing tensor and/or matrix multiplications. Tensor and/or matrix multiplications are the central computing operations for deep learning. The computer preferably also comprises hardware accelerators for artificial intelligence, in particular so-called deep learning accelerators. The computer or control unit is also configured such that it can be expanded modularly with numerous, preferably at least four, such chips. As a result, the computer is optimized overall for machine learning, and can be scaled, i.e. the computer can be adapted for various SAE J3016 stages.

In a preferred development of the invention, the computer is configured to determine a confidence level for the data from the imaging sensors. This means that the computer determines how trustworthy the data from the imaging sensors are, i.e. how reliable the computer is at recognizing objects. If, for example, an imaging sensor is obstructed, then the computer assigns a confidence level of 0 to this sensor. In this case, the data from another imaging sensor are used. If the vehicle occupant looks to the right, for example, then a camera located behind a steering wheel has a confidence level of 50%, for example, and a camera located in the line of sight of vehicle occupant has a confidence level of 100%. In this manner, it is ensured that only those imaging sensors are used for the object recognition that deliver the best data, i.e. the data with the highest confidence levels. If two imaging sensors provide data with the same confidence level, these data can be combined.

The interior monitoring system for a vehicle according to the invention comprises a first and at least one second imaging sensor. The interior monitoring system also comprises a control unit according to the invention. Data exchange occurs between the sensors and the control unit.

An interior monitoring system is a sensor system for locating and/or classifying, preferably in a three dimensional image, of vehicle occupants. The interior monitoring system provides data in particular for safety-relevant aspects, e.g. the force with which the airbags and/or seatbelt tensioners are deployed, based on a position of a vehicle occupant, or interior temperatures. The interior monitoring system also determines the use of other adaptive safety functions. The interior monitoring system can determine the head orientation and/or head position particularly precisely with the control unit according to the invention. As a result, the interior monitoring system can particularly precisely determine, e.g., whether a driver is looking at the road, in order to decide whether the driver can assume control of a vehicle, referred to in English as a take-over, if the vehicle was previously being driven automatically.

The first sensor is preferably a sensor for a 2D camera, and the second sensor is preferably a sensor for a 3D camera, in particular a time-of-flight camera. A 2D camera is inexpensive. The 2D camera is a 2D mono-camera, for example. The second sensor is alternatively a sensor for a 2D stereo camera system. A 2D stereo camera system forms a 3D camera. A 3D camera provides depth of field information and thus improves the determination of a head orientation and/or head position. By consolidating the data from the 2D camera with that from the 3D camera, the determination of the head orientation and/or head position is further optimized. With a time-of-flight camera, (TOF), a depth of field image of a head is obtained by measuring the time of flight of the light in pixels.

The computer program according to the invention is used for determining a head orientation and/or head position of a vehicle occupant. The computer program comprises software code segments. The software code segments cause the interior monitoring system according to the invention to execute a method according to the invention when the computer program runs on an control unit according to the invention for the interior monitoring system.

The software code segments of the computer program represent a sequence of commands, which cause the control unit, when the computer program is loaded, to determine the head orientation and/or head position, and output a signal based on this determination, in particular for controlling safety-relevant vehicle functions. The computer program thus generates a technological effect.

The computer program preferably comprises software code segments that cause the control unit to determine a confidence level for the data from imaging sensors in the interior monitoring system.

Another aspect of the invention is a computer-readable data carrier on which the computer program according to the invention is stored. By way of example, the control unit loads and executes the data carrier in the memory modules of the computer. The data carrier is a USB stick, an SD card, advantageously an SD card with integrated WLAN functions, a CD, DVD, or Blu-ray disc, for example.

Exemplary embodiments are shown in the figures. Therein:

The same reference symbols are used to indicate functionally identical or similar components in the figures. For purposes of clarity, only the respective relevant components are indicated with reference symbols in the figures, in order to avoid repetition.

Figure 1:
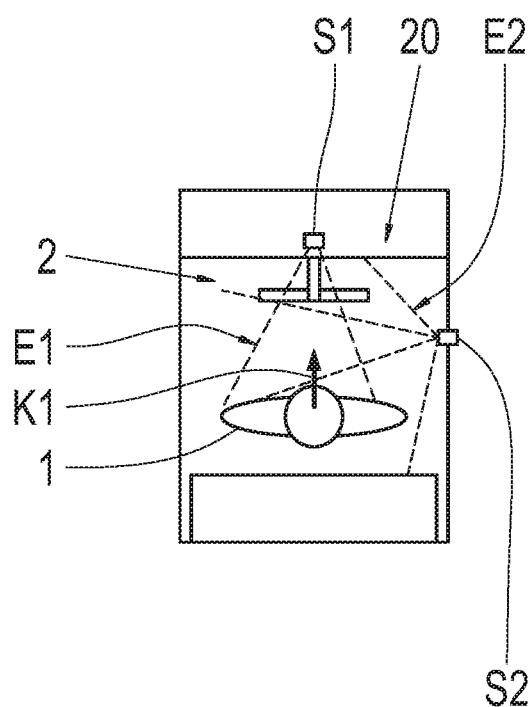
FIG. 1 shows an exemplary embodiment of an interior monitoring system according to the invention.
Figure 2:
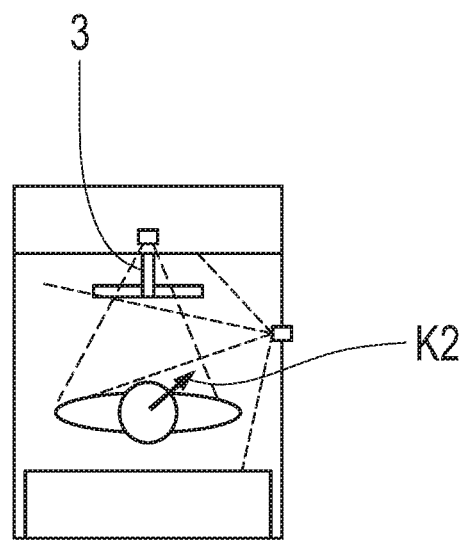
FIG. 2 shows a second exemplary embodiment of the interior monitoring system according to the invention.

A vehicle occupant 1 is shown in an interior 2 of a passenger car in FIG. 1 and FIG. 2. The vehicle occupant 1 is a driver sitting on a driver's seat behind a steering wheel 3.

The interior 2 comprises an interior monitoring system 20. A first imaging sensor S1 and a second imaging sensor S2 of the interior monitoring system 20 are shown in FIG. 1. The first imaging sensor S1 is a 2D mono-camera, mounted behind the steering wheel 3 on the windshield. First head orientations K1 and head positions looking straight ahead can be particularly precisely determined in a first detection range E1 of the first imaging sensor S1. The second imaging sensor S2 is a 3D camera mounted in the ceiling of the vehicle interior, above and to the right of the vehicle occupant. Second head orientations K2 and head positions looking toward the right can be particularly precisely determined in a second detection range E2 of the second imaging sensor S2. The detection ranges E1 and E2 have already been determined based on various head orientations and head positions. If the vehicle occupant 1 is looking straight ahead, the data from the first imaging sensor S1 are used for determining the head orientation K1 and head position. If the vehicle occupant 1 is looking to the right, the data from the second imaging sensor S2 are used for determining the head orientation K2 and head position. In this case, the head orientation K2 and head position are more precisely determined with the second imaging sensor S2. If the vehicle occupant 1 is looking in a direction between the first imaging sensor S1 and the second imaging sensor S2, the data from both sensors S1 and S2 are combined.

Figure 3:
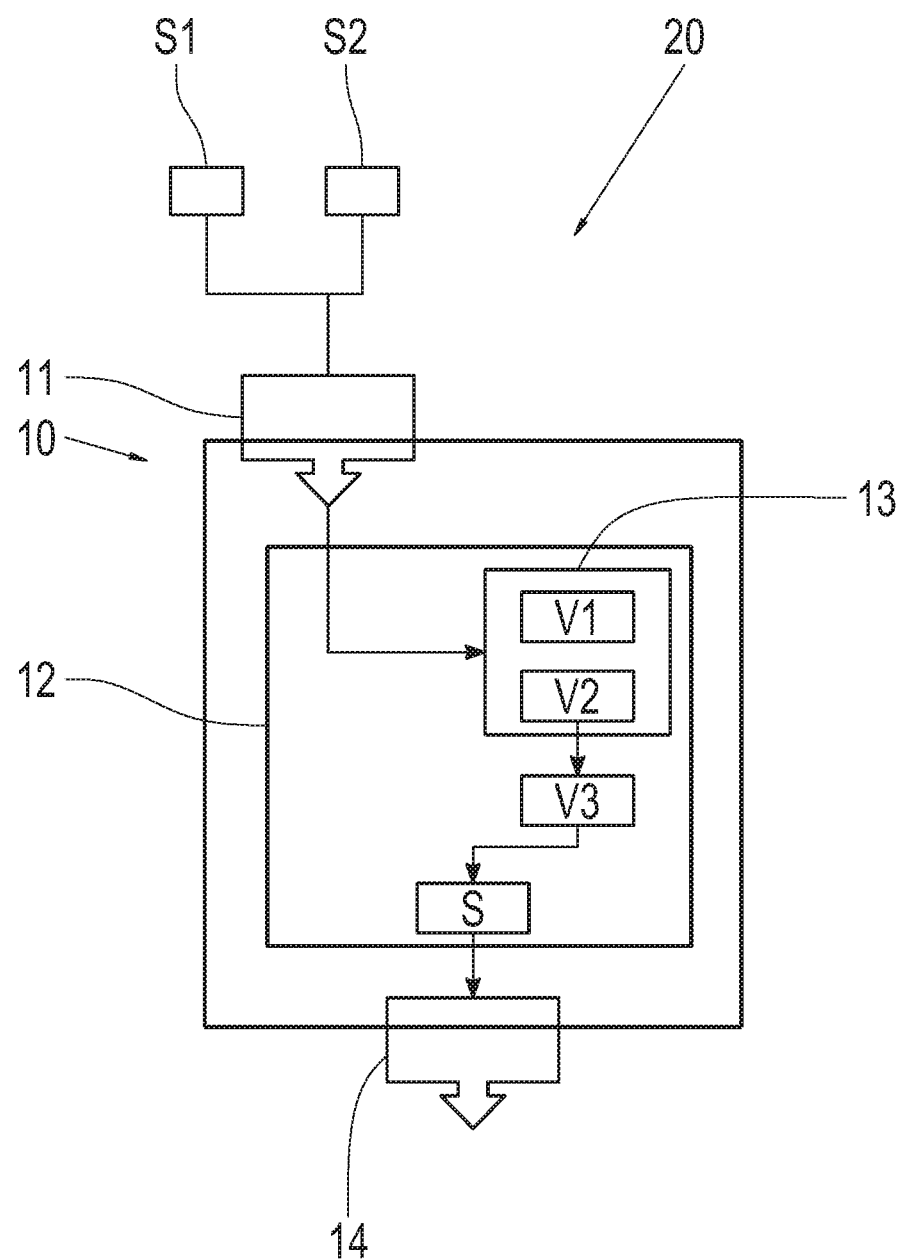
FIG. 3 shows an exemplary embodiment of a control unit according to the invention with a schematic illustration of the method according to the invention.

FIG. 3 shows a control unit 10 according to the invention in the interior monitoring system 20.

The control unit 10 comprises a first interface 11. The control unit 10 is connected for signal exchange to the imaging sensors S1 and S2 in the interior monitoring system 20 via the first interface 11. Data from the sensors S1 and S2 are sent to a computer 12 in the control unit via the first interface 11. The computer 12 comprises a memory 13. The following steps are carried out prior to active use of the interior monitoring system 20:

V1: determining the first detection range E1 of the first imaging sensor S1 for head orientations K1, K2 and/or head positions based on various head orientations K1, K2 and/or head positions in relation to the position of the first sensor S1; and V2: determining the second detection range E2 of the second imaging sensor S2 for head orientations K1, K2 and/or head positions based on various head orientations K1, K2 and/or head positions in relation to the position of the second sensor S2.

The results of steps V1 and V2 are stored in the memory 13. The computer 12 executes step V3, specifically based on the head orientation K1, K2 and/or head position of the vehicle occupant 1, to determine the head orientation K1, K2 and/or head position with that sensor S1, S2 with a detection range E1, E2 within which the head orientation K1, K2 and/or head position can better be determined than in the detection range E1, E2 of another sensor S1, S2. During the execution of step V3, the computer 12 accesses the results stored in the memory 13. As a result, the computer 12 obtains a signal S for actuating vehicle actuators based on the determined head orientation K1, K2 and/or head position. The signal S is provided to the control unit 10 via a second interface 14.

REFERENCE SYMBOLS 1 vehicle occupant
2 interior
3 steering wheel
E1 first detection range
S1 first imaging sensor
K1 first head orientation
E2 second detection range
S2 second imaging sensor
K2 second head orientation
10 control unit
11 first interface
12 computer
13 memory
14 second interface
20 interior monitoring system

The invention claimed is:

1. A method comprising:
   determining a first detection range of a first imaging sensor comprising a first camera for sensing at least head orientations of a vehicle occupant based on various head orientations in relation to a position of the first sensor;
   determining a second detection range of a second imaging sensor comprising a second camera for sensing at least head orientations of the vehicle occupant based on various head orientations in relation to a position of the second sensor;
   based on the sensed head orientation of the vehicle occupant from the first imaging sensor and the second imaging sensor, determining that a determined head orientation is more precisely determined using the first detection range of the first imaging sensor than the second detection range of the second imaging sensor;
   determining the determined head orientation of the vehicle occupant using the first detection range of the first imaging sensor without using the second detection range of the second imaging sensor; and
   controlling a vehicle actuator based at least in part on the determined head orientation of the vehicle occupant.

2. The method according to claim 1, wherein:
   a plurality of imaging sensors are utilized, wherein only data from one or more sensors in the detection range in which the head orientation can be precisely determined is at least one of utilized or combined in order to determine the determined head orientation of the vehicle occupant.

3. The method according to claim 1, wherein the method is executed by a computer.

4. The method according to claim 1, further comprising:
   determining a first confidence level for the data from the first imaging sensor and a second confidence level for the data from the second imaging sensor; and
   determining that the determined head orientation is more precisely determined using the first detection range of the first imaging sensor than the second detection range of the second imaging sensor in response to determining that the first confidence level for the data from the first imaging sensor is higher than the second confidence level for the data from the second imaging sensor.

5. The method according to claim 1, wherein
   determining that the determined head orientation is more precisely determined using the first detection range of the first imaging sensor than the second detection range of the second imaging sensor further comprises determining that the first imaging sensor has a higher precision than the second imaging sensor based on the sensed head orientation of the vehicle occupant from the first imaging sensor and the second imaging sensor.

6. The method according to claim 1, further comprising:
   determining that the determined head orientation is more precisely determined using the first detection range of the first imaging sensor than the second detection range of the second imaging sensor based on a determination that the sensed head orientation of the vehicle occupant from the first imaging sensor and the second imaging sensor is toward the first imaging sensor.

7. A control unit for automated driving functions, comprising:
at least one interface configured to obtain data from a first imaging sensor and a second imaging sensor, the data comprising at least sensed head orientations of a vehicle occupant;
a computer comprising a memory storing a first detection range of the first imaging sensor comprising a first camera for sensing at least head orientations based on various head orientations in relation to a position of the first imaging sensor, and storing a second detection range of the second imaging sensor comprising a first camera for sensing at least head orientations based on various head orientations in relation to a position of the second sensor, wherein the computer is configured to:
determine, based on the sensed head orientation of the vehicle occupant from the first imaging sensor and the second imaging sensor, that a determined head orientation is more precisely determined using the first detection range of the first imaging sensor than the second detection range of the second imaging sensor;
determine the determined head orientation of the vehicle occupant using the first detection range of the first imaging sensor without using the second detection range of the second imaging sensor; and
determine a signal based on the determined head orientation of the vehicle occupant; and
a second interface for outputting the signal and controlling a vehicle actuator based at least in part on the signal.

8. The control unit according to claim 7, wherein the computer is configured to determine a confidence level for the data from the first imaging sensor and the second imaging sensor.

9. The control unit according to claim 8, wherein the computer is configured to:
determine that the determined head orientation is more precisely determined using the first detection range of the first imaging sensor than the second detection range of the second imaging sensor in response to determining that the confidence level for the data from the first imaging sensor is higher than the confidence level for the data from the second imaging sensor.

10. An interior monitoring system for a vehicle, comprising:
the first imaging sensor and the second imaging sensor; and
the control unit according to claim 7, wherein the control unit is configured such that a data exchange takes place between the first imaging sensor and the second imaging sensor and the control unit.

11. The interior monitoring system according to claim 10, wherein one of the first imaging sensor and the second imaging sensor comprises a 2D camera, and the other of the first imaging sensor and the second imaging sensor comprises a 3D camera.

12. The control unit according to claim 7, wherein the computer is configured to:
determine that the determined head orientation is more precisely determined using the first detection range of the first imaging sensor than the second detection range of the second imaging sensor by determining that the first imaging sensor has a higher precision than the second imaging sensor based on the sensed head orientation of the vehicle occupant from the first imaging sensor and the second imaging sensor.

13. The control unit according to claim 7, wherein the computer is configured to:
determine that the determined head orientation is more precisely determined using the first detection range of the first imaging sensor than the second detection range of the second imaging sensor based on a determination that the sensed head orientation of the vehicle occupant from the first imaging sensor and the second imaging sensor is toward the first imaging sensor.

14. A non-transitory computer readable medium having stored thereon a computer program that, when executed by at least one processing device of a control unit, causes the processing device to perform a method comprising:
determining a first detection range of a first imaging sensor comprising a first camera for sensing at least head orientations of a vehicle occupant based on various head orientations in relation to a position of the first sensor;
determining a second detection range of a second imaging sensor comprising a second camera for sensing at least head orientations of the vehicle occupant based on various head orientations in relation to a position of the second sensor;
based on the sensed head orientation of the vehicle occupant from the first imaging sensor and the second imaging sensor, determining that a determined head orientation is more precisely determined using the first detection range of the first imaging sensor than the second detection range of the second imaging sensor;
determining the determined head orientation of the vehicle occupant using the first detection range of the first imaging sensor without using the second detection range of the second imaging sensor; and
controlling a vehicle actuator based at least in part on the determined head orientation of the vehicle occupant.

15. The non-transitory computer readable medium according to claim 14, wherein the computer program, when executed by the at least one processing device of the control unit, causes the processing device to perform the method further comprising:
determining a confidence level for the data from the first imaging sensor and the second imaging sensor.

16. The non-transitory computer readable medium according to claim 15, wherein the computer program, when executed by the at least one processing device of the control unit, causes the processing device to perform the method further comprising:
determining that the determined head orientation is more precisely determined using the first detection range of the first imaging sensor than the second detection range of the second imaging sensor in response to determining that the confidence level for the data from the first imaging sensor is higher than the confidence level for the data from the second imaging sensor.

17. The non-transitory computer readable medium according to claim 14, wherein the computer program, when executed by the at least one processing device of the control unit, causes the processing device to perform the method, wherein
determining that the determined head orientation is more precisely determined using the first detection range of the first imaging sensor than the second detection range of the second imaging sensor further comprises determining that the first imaging sensor has a higher precision than the second imaging sensor based on the sensed head orientation of the vehicle occupant from the first imaging sensor and the second imaging sensor.

18. The non-transitory computer readable medium according to claim 14, wherein the computer program, when executed by the at least one processing device of the control unit, causes the processing device to perform the method further comprising:

determining that the determined head orientation is more precisely determined using the first detection range of the first imaging sensor than the second detection range of the second imaging sensor based on a determination that the sensed head orientation of the vehicle occupant from the first imaging sensor and the second imaging sensor is toward the first imaging sensor.

* * * * *